US012405005B2

(12) United States Patent
San-Miguel et al.

(10) Patent No.: US 12,405,005 B2
(45) Date of Patent: Sep. 2, 2025

(54) REFRACTORY TILE (71) Applicant: SAINT-GOBAIN CENTRE DE RECHERCHES ET D'ETUDES EUROPEEN, Courbevoie (FR)

(72) Inventors: Laurie San-Miguel, Althen des Paluds (FR); Sébastien Pinson, Gordes (FR); Keith Mann, Worcester (GB); Benedikt Fischer, Rödental Bayern (DE); Denis Pfuetze, Rödental Bayern (DE)

(73) Assignee: SAINT-GOBAIN CENTRE DE RECHERCHES, Courbevoie (FR)

( * ) Notice: Subject to any disclaimer, the term of this patent is extended or adjusted under 35 U.S.C. 154(b) by 801 days.

(21) Appl. No.: 17/770,879

(22) PCT Filed: Oct. 23, 2020

(86) PCT No.: PCT/EP2020/079957
§ 371 (c)(1),
(2) Date: Apr. 21, 2022

(87) PCT Pub. No.: WO2021/078974
PCT Pub. Date: Apr. 29, 2021

(65) Prior Publication Data
US 2022/0373172 A1   Nov. 24, 2022

(30) Foreign Application Priority Data
Oct. 24, 2019   (FR) ...................................... 1911923

(51) Int. Cl.
*F23M 5/02*   (2006.01)
*F23M 5/08*   (2006.01)
(52) U.S. Cl.
CPC ................ *F23M 5/02* (2013.01); *F23M 5/08* (2013.01)

(58) Field of Classification Search
CPC .... F23M 5/02; F23M 5/08; F23M 2700/0053; F23M 2700/0056; F22B 37/108; F27D 1/045
See application file for complete search history.

(56) References Cited

U.S. PATENT DOCUMENTS 3,765,664 A * 10/1973 Ojima ...................... C21C 5/40
266/280
3,838,665 A * 10/1974 Astrom .................... F23M 5/08
373/76

(Continued)

FOREIGN PATENT DOCUMENTS

| DE | 4115714 A1 | 11/1991 |
| DE | 20316213 U1 | 3/2005 |
| WO | 2007137189 A2 | 11/2007 |

OTHER PUBLICATIONS

International Search Report corresponding to International Application No. PCT/EP2020/079957, dated Jan. 25, 2021, 5 pages.

*Primary Examiner* — David J Laux
(74) *Attorney, Agent, or Firm* — Ronald M. Kachmarik; Cooper Legal Group LLC (57) ABSTRACT Refractory tile for protecting a wall of energy recovery tubes. A hot face of the tile is to be exposed to the interior of the furnace. A cold face, opposite the hot face, defines: a groove extending over the entire length of the tile and to receive one the tubes, and a fastening receptacle configured to receive a retaining member to immobilize the tile with respect to the tube. The tile has, in a transverse section plane, at least at each position between the position of the groove and the position of the fastening receptacle, a non-zero material thickness. The thickness is measured between the transverse profile of the hot face and a straight segment, (Continued)

which is referred to as the base and links the ends of the transverse profile of the hot face. The positions are determined along the base.

19 Claims, 5 Drawing Sheets

(56) References Cited

U.S. PATENT DOCUMENTS

| | | | | |
|---|---|---|---|---|
| 5,154,139 | A * | 10/1992 | Johnson | F23M 5/02 |
| | | | | 165/162 |
| 2007/0271867 | A1 * | 11/2007 | Taber | F28D 1/06 |
| | | | | 52/506.03 |

* cited by examiner

REFRACTORY TILE

TECHNICAL FIELD

The invention relates to a refractory tile intended to protect one or more of the tubes conventionally disposed inside the combustion chamber of a furnace for incinerating household waste, ultimate waste of an industrial or medical nature or origin, or biomass, in order to recover some of the heat energy that is produced.

The invention also relates to a furnace, in particular a furnace for incinerating household waste or biomass, comprising such a tile.

PRIOR ART

Energy recovery tubes are conventionally substantially vertical and connected together by transverse bars. Together they form a wall of tubes that extends against the wall of the furnace that defines the combustion chamber. The heat transfer fluid, conventionally water, that circulates in the tubes thus recovers some of the heat released during incineration.

Tiles forming a refractory lining protect the tubes from physical contact with the materials being combusted and with the smoke and ashes resulting from this combustion. Such tiles are described in EP 1856468, for example. The low thickness and the high thermal conductivity of the tiles facilitates the transfer of heat from the reactor to the water circulating in the tubes.

Close contact between the tiles and the tubes is also sought. To this end, as described in EP 1032790, for example, the cold face of the tiles conventionally has a plurality of semi-cylindrical channels, or "grooves", shaped so as to each receive a tube of the wall of tubes. A thin layer of liquid mortar also can be disposed behind the tiles in order to limit the volume of empty spaces between the tiles and the tubes, and thus further improve heat exchanges.

The use of floating tiles hung from the wall of tubes gives the tiles a certain amount of mobility with respect to each other. To this end, the tiles can be, for example, freely hung from hooks fastened to the middle of the bars and the tiles can be spaced apart from each other by a few millimeters. The refractory lining thus can adapt to the dimensional variations of the tiles during the thermal cycles. A fibrous mat of a few millimeters also can be disposed between the tiles in order to provide a good seal and to accommodate any expansion when the temperature rises.

The tiles must provide temperature protection for the tubes, for a long service life, while ensuring adequate heat transfer. Excessively high heat transfer can cause dioxins to be generated among the gases emitted by the incineration furnace. Excessively low heat transfer is detrimental to energy recovery efficiency and tends to generate high temperatures on the hot face, promoting corrosion kinetics. Finally, the amount of material needed for a tile must be as low as possible in order to minimize manufacturing costs while preserving the thermomechanical behavior.

The present invention aims to at least partially address these requirements.

DISCLOSURE OF THE INVENTION

Summary of the Invention

The invention proposes a refractory tile, which is intended, in a service position, to protect a wall of energy recovery tubes internally lining a combustion chamber of a furnace, preferably of a furnace for incinerating household waste or biomass, said tile having:
- a face, called "hot face" or "intrados", which is intended, in said service position, to be exposed inside the furnace;
- a face, called "cold face" or "extrados", opposite the hot face, defining:
  - a groove extending over the entire length of the tile and intended, in said service position, to receive one of said tubes; and
  - a fastening receptacle configured to receive, in said service position, an anchor, or "retaining member", so as to immobilize the tile with respect to said tube, the tile being characterized in that it has, in a transverse section plane, at least at each position between the position of the groove and the position of the fastening receptacle, a non-zero material thickness, the thickness being measured between the transverse profile of the hot face and a straight segment, called "base", connecting the ends of the transverse profile of the hot face, said positions being determined along said base.

As will be seen in more detail in the remainder of the description, this results in better surface heat transfer, which promotes heat exchanges with the heat transfer fluid circulating in the tube, and a reduced risk of cracking.

Without being bound by this theory, the inventors explain this result by the absence of a significant increase in the temperature of the hot face of the tile, nor in the temperature in the vicinity of the anchor.

Preferably, the material thickness progressively varies between the position of the groove and the position of the fastening receptacle. Preferably, the material thickness progressively decreases from the position of the fastening receptacle to the position of the groove. Preferably, the material thickness progressively decreases from the position of the fastening receptacle to the end of the base of the tile (on the groove side).

A material thickness above the base is not essential outside the region included between the position of the groove and the position of the fastening receptacle. The tile advantageously remains compact and light.

A tile according to the invention can further comprise one or more of the following optional and preferred features:
- in at least one of said groove and fastening receptacle positions, preferably at each of said groove and fastening receptacle positions, said material thickness is greater than 0.5 mm, preferably greater than 5 mm, and/or less than 50 mm, preferably less than 30 mm, preferably less than 20 mm, preferably less than 15 mm;
- preferably, at the position of the fastening receptacle, said material thickness is greater than 0.5 mm, preferably greater than 5 mm, and/or less than 50 mm, preferably less than 30 mm, preferably less than 20 mm, preferably less than 15 mm;
- in at least one of said positions of the groove and the fastening receptacle, preferably only at the position of the fastening receptacle, said material thickness is maximal;
- the tile has one of said material thicknesses for any position on a segment of said base representing more than 30%, preferably more than 40%, more than 50%, more than 70%, more than 90%, preferably substantially 100% of the length of the base;

said material thickness increases when the position, along the base, approaches the position of the fastening receptacle;

said material thickness decreases as it moves away, along the base, from the position of the fastening housing toward the position of the groove;

preferably, said material thickness decreases as it moves away, along the base, from the position of the fastening housing toward the position of the groove, at least up to the position of the groove;

said transverse profile develops, along said base, without a break in the slope;

said transverse profile is strictly convex over more than 80%, preferably more than 90%, preferably 100% of the width of the tile;

the position, along the base, of the middle of the strictly convex part of said transverse profile is preferably the position of said fastening receptacle along the base;

said strictly convex portion is symmetrical with respect to an axis perpendicular to said base and positioned at the position of said fastening receptacle;

the tile comprises a single fastening receptacle;

the tile comprises exactly two grooves, extending either side of a single fastening receptacle;

said transverse profile is symmetrical with respect to the median longitudinal plane of the tile;

the cold face has a longitudinal bevel along at least one, preferably along each, of the longitudinal edges thereof, which advantageously reduces the amount of material used;

the longitudinal bevel has a flat portion, or is even flat, which advantageously lightens the tile and facilitates the installation of a fiber mat;

the cold face has a transverse bevel along at least one, preferably along each, of the transverse edges thereof, which advantageously allows the tile to be inclined when it is installed on the anchor and facilitates concrete filling when the lining is installed;

said transverse section plane can be any transverse section plane of a fraction of the tile included between two transverse planes separated by a distance, along the direction of the length of the tile, representing more than 50%, preferably more than 70%, more than 90%, preferably 100% of the length of the tile, with the length of the tile being defined by the general direction of the groove;

the hot face has, in the median longitudinal plane, preferably in any longitudinal plane, a longitudinal profile configured so that the material thickness between the base plane of the hot face and said longitudinal profile is maximal at the position of the transverse plane that passes through the position of the fastening receptacle;

the material thickness between the base plane of the hot face and the hot face is maximal at the position of the anchor in the service position.

The invention also relates to a furnace, in particular a furnace for incinerating household waste or biomass, comprising a combustion chamber internally lined with:

a plurality of energy recovery tubes; and an assembly of refractory tiles suspended from anchors rigidly connected to said tubes and arranged so as to protect said tubes;

said assembly comprising a tile according to the invention, and preferably made up of a plurality of tiles according to the invention.

Definitions

The "service position" is the position in which the tile is suspended inside the combustion chamber, so as to physically separate a portion of at least one tube of a heat exchanger and the inside of the chamber.

The direction of the length of the tile is defined by the general direction of the groove. In the service position, this direction is conventionally vertical. A longitudinal edge is an edge that extends along the direction of the length.

The direction of the width of the tile is defined by the direction perpendicular to the direction of the length, in the general plane of the tile. A transverse edge is an edge that extends along the direction of the width.

The thickness is measured perpendicular to the directions of the length and of the width.

A longitudinal plane is a plane perpendicular to the direction of the width of the tile.

A longitudinal profile is a profile in a longitudinal plane.

The positions of the groove and of the fastening receptacle along the base are the position of the projection of the centers of the groove and of the fastening receptacle, respectively, on this base, perpendicular to this base. In an orthonormal reference frame Oxyz, in which the axis of abscissa would extend along the base, the positions of the groove and of the fastening receptacle along said base are therefore the abscissas of their centers. An example of such a reference frame has been shown in FIG. 4d.

More generally, any position of an object along the base is the position of the projection of the center of this object on this base, perpendicular to this base.

The median longitudinal plane is the longitudinal plane at the mid-width of the tile.

A transverse plane is a plane perpendicular to the direction of the length of the tile.

A transverse profile is a profile in a transverse plane.

Figure 3:
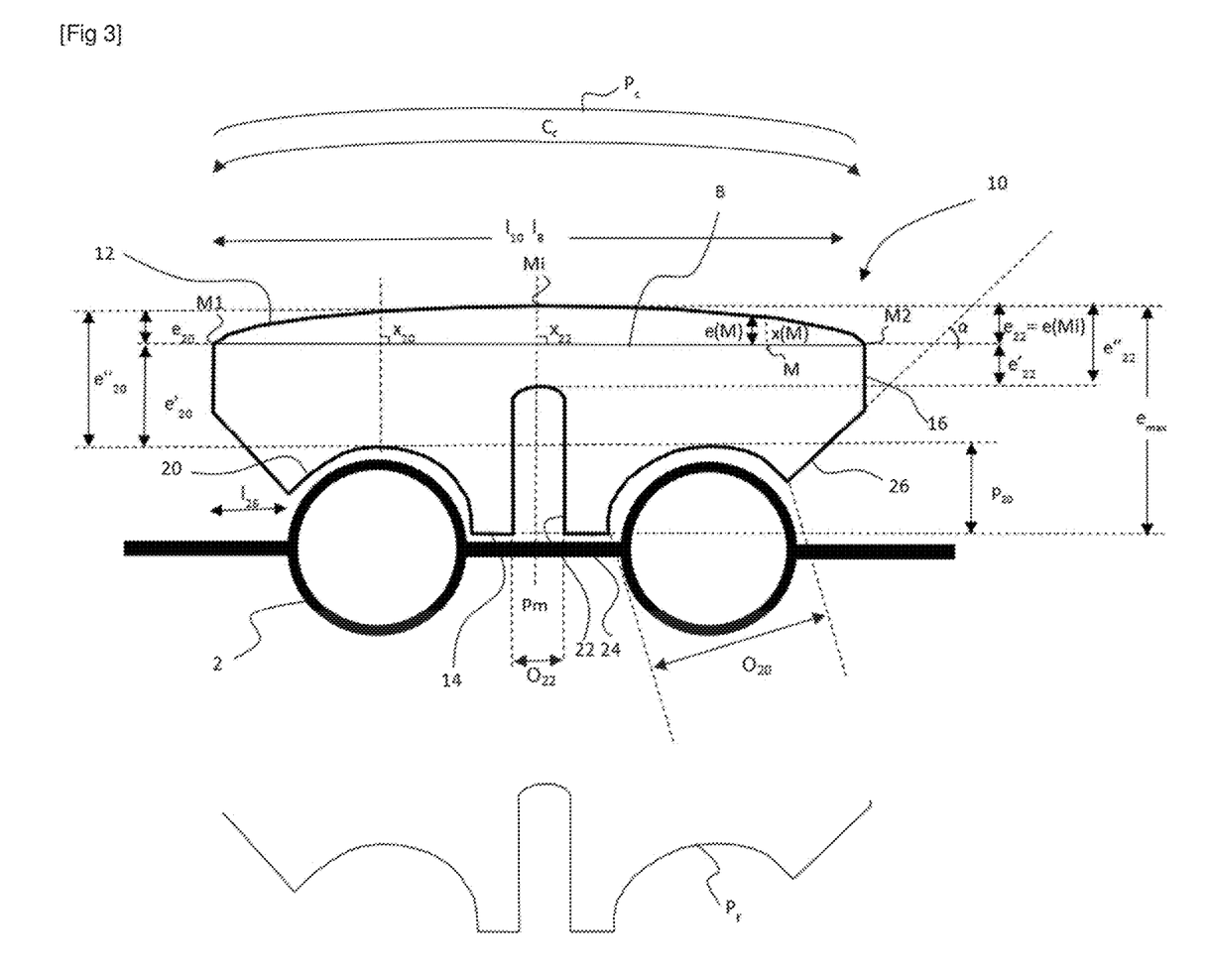
FIG. 3 schematically shows the tile of FIG. 1 viewed in a median transverse section plane in a service position.

The "ends" of the transverse profile are the points that define the two extreme limits, i.e. the ends, of the profile. FIG. 3 shows, for example, the ends M1 and M2 of the transverse profile of the hot face.

The median transverse plane is the transverse plane at the mid-length of the tile.

The adjectives "hot" and "cold" are used for the sake of clarity. Before the furnace is in service, the "hot" face is the face that is intended to be subjected to the highest temperatures after start-up. The cold face is the face that is exposed toward the outside of the combustion chamber, i.e. toward the tubes.

In a transverse plane, the "base" refers to the line segment that connects the ends of the transverse profile of the hot face.

Viewed from the front, the hot and cold faces of a tile are conventionally externally defined by respective contours, generally substantially rectangular, which extend in planes, called "base planes", of the hot and cold faces, respectively.

Unless otherwise stated, all oxide contents are mass percentages based on the oxides. A mass content of an oxide of a metal element refers to the total content of this element expressed in the form of the most stable oxide, in accordance with the standard convention of the industry.

Unless otherwise stated, the dimensions (thickness, width, length, diameter) are expressed in mm.

"Comprise", "define", "have" or "include" must be understood in a broad, non-limiting manner.

BRIEF DESCRIPTION OF THE DRAWINGS

Further features and advantages of the invention will become more apparent upon reading the following non-limiting detailed description, and with reference to the accompanying drawings, in which.

In the various figures, identical or similar reference signs are used to denote identical or similar parts or parts of parts.

DETAILED DESCRIPTION

In a furnace, it is worthwhile recovering some of the energy available in the combustion chamber. To this end, the furnace is conventionally equipped with a heat exchanger comprising a plurality of tubes 2 disposed inside the chamber, conventionally against the wall of the chamber. A heat transfer fluid, preferably water, circulates in the tubes.

A refractory lining protects the tubes 2 while allowing heat energy to be transferred to the heat transfer fluid. This lining comprises a tile 10 according to the invention, preferably it is made up of tiles 10 according to the invention.

The tile 10 can be made of a material comprising at least 60%, preferably at least 90%, more preferably at least 99% of non-siliceous oxides, in percentages by weight based on the oxides. For example, these non-siliceous oxides are selected from alumina, zirconia, chromium oxide $Cr_2O_3$, hafnium oxide ($HfO_2$) or mixtures thereof.

Preferably, in particular for incineration applications, the material of the tile according to the invention comprises silicon carbide (SiC), preferably it is substantially made up of SiC bound by a binding matrix of the oxide type, such as mullite ($3Al_2O_3,2SiO_2$) or alumina ($Al_2O_3$) or a nitride binding matrix, such as $Si_3N_4$, $Si_2ON_2$, or even SiAlON. More preferably, it comprises less than 2%, preferably less than 1% by weight of residual metal silicon (Si) and/or less than 15% of silica ($SiO_2$). Silicon and silica are in fact unfavorable for corrosion resistance.

Preferably, the tile is made of a sintered refractory material.

The length $L_{10}$ of the tile is preferably greater than 100 mm, preferably greater than 150 mm and/or less than 500 mm, preferably less than 300 mm.

The width $I_{10}$ of the tile is preferably greater than 60 mm, preferably greater than 100 mm and/or less than 500 mm, less than 300 mm, preferably less than 200 mm.

The overall thickness $e_{max}$ of the tile is preferably greater than 20 mm, preferably greater than 25 mm and/or less than 100 mm, less than 80 mm, preferably less than 60 mm.

Figure 1:
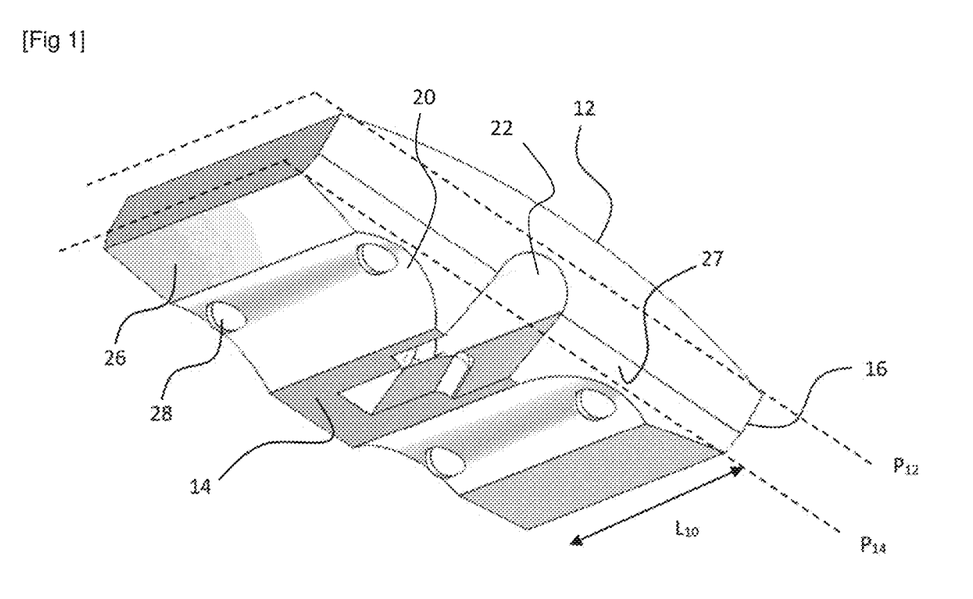
FIG. 1 schematically shows a tile according to the invention as a perspective view.

The hot 12 and cold 14 faces of the tile 10 are conventionally externally defined by respective contours, generally substantially rectangular, that extend in planes, called "base planes" $P_{12}$ and $P_{14}$, respectively, conventionally substantially parallel to each other, as shown in FIG. 1. These generally rectangular contours are conventionally visible when these hot and cold faces are observed from the front, i.e. in the direction of the thickness.

The cold and hot faces are connected together by side faces 16, which, in the service position, are opposite side faces of adjacent tiles. In the embodiment of FIG. 3, the side faces 16 are substantially perpendicular to the base plane $P_{12}$.

The cold face 14 conventionally defines at least one groove 20, preferably more than one groove and preferably less than 5, preferably two, three or four grooves.

Each groove preferably has a shape matching that of a tube 2 of the heat exchanger that it is intended to receive in the service position of the tile, as shown in FIG. 3. Therefore, each groove receives a single tube. Preferably, it has a cylindrical shape, with a circular base.

The grooves 20 are preferably evenly spaced apart over the width of the tile 10.

The groove 20 conventionally extends over the entire length of the tile 10. It preferably has an opening $O_{20}$ that is greater than 25 mm, preferably greater than 35 mm and/or less than 100 mm, preferably less than 80 mm. It preferably has a depth $p_{20}$, measured in the direction of the thickness at the point closest to the base (at position $x_{20}$), that is greater than 5 mm, preferably greater than 10 mm and/or less than 70 mm, preferably less than 50 mm. The radius of curvature of the groove is a function of the radius of the opposite tube, and preferably ranges between 25 and 100 mm.

The cold face 14 conventionally defines at least one fastening receptacle 22, preferably more than one fastening receptacle and preferably less than 5, less than 4, less than 3 fastening receptacles, preferably a single fastening receptacle.

Each fastening receptacle 22 is shaped so as to engage with a respective anchor, not shown. The weight of the tile is conventionally supported by a lower tile on which the tile rests. The anchor, or "stud", is intended to prevent the tile from tilting away from the tubes. Preferably, it is configured to hold the tile at a predetermined distance from the tubes 2, preferably by a distance that is greater than 4 mm, greater than 5 mm and/or less than 20 mm, preferably less than 10 mm. The space thus provided between the tile and the tubes may or may not be filled with mortar. The anchor conventionally assumes the general form of a threaded rod or a screw or other tightening system.

The anchors are rigidly connected to the network of tubes 2, for example, welded to bars or to a metal plate 24 connecting the tubes. The presence of a plurality of fastening notches per tile, preferably two, advantageously guarantees that the tile is held in position in the event of the failure of one of the anchors. The presence of a single notch is nevertheless preferred since it provides greater freedom of movement to the tile and thus limits the constraints when the tile is installed and the temperature of the furnace rises.

In a median transverse section plane, the cold face 14 has a transverse profile Pf, shown in FIG. 3 for greater clarity. Preferably, the transverse profile of the cold face is the same regardless of the transverse section plane selected in a portion of the tile extending, between two transverse planes, over more than 50%, more than 70%, more than 90%, preferably substantially 100% of the length of the tile.

Preferably, the cold face is substantially flat between the grooves, outside the zones defining the one or more groove(s) and the one or more fastening receptacle(s).

In a preferred embodiment, the cold face is longitudinally beveled. Preferably, it has, from each of the longitudinal edges thereof, a flat portion, or longitudinal "bevel" 26. Preferably, the longitudinal bevel 26 is inclined, with respect to the base plane $P_{12}$, by an angle α that is greater than 10° and/or less than 45°. Preferably, the width $I_{26}$ of the longitudinal bevel 26 is greater than 10 mm and/or less than 50 mm.

In a preferred embodiment, the cold face is transversely beveled. Preferably, it has, from each of the transverse edges thereof, a flat portion, or transverse "bevel" 27. Preferably, the transverse bevel 27 is inclined, with respect to the base plane $P_{14}$, by an angle that is greater than 10° and/or less than 45°. Preferably, the width of the transverse bevel 27 is greater than 10 mm and/or less than 50 mm.

Figure 2:
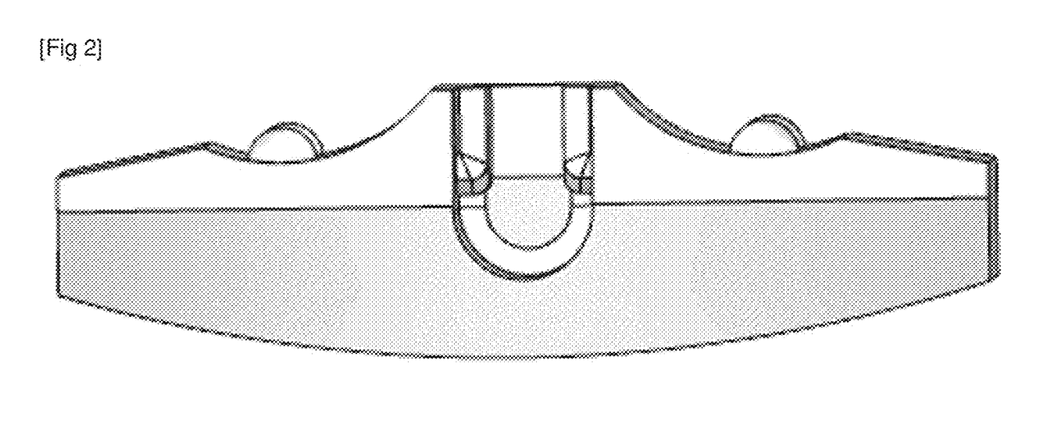
FIG. 2 schematically shows the tile of FIG. 1 as a bottom view.

In a preferred embodiment, as shown in FIGS. 1 and 2, the cold face supports one or more spacers 28, preferably disposed in the grooves and intended to keep the surfaces of the grooves slightly spaced apart from the tubes in the service position.

Preferably, the hot face has no protruding edge longer than 10 mm or 20 mm, preferably no edge marking a break in the slope.

In one embodiment, the hot face 12 does not have a flat surface parallel to the base plane $P_{12}$, preferably no flat zone, as in FIGS. 1 to 3, with a line not being considered to be a surface.

Preferably, a tile according to the invention has, on the side of the hot face, a non-zero material thickness above said groove and above said fastening receptacle, preferably above each groove and above each of said fastening receptacles, with said thickness being measured between the hot face and the base plane $P_{12}$.

Preferably, the material thickness, measured between the hot face and the base plane $P_{12}$, progressively varies between the position of the groove and the position of the fastening receptacle.

Preferably, the material thickness, measured between the hot face and the base plane $P_{12}$, progressively decreases from the position of the fastening receptacle to the position of the groove. Preferably, said material thickness progressively decreases from the position of the fastening receptacle to the longitudinal edge of the tile located on the side of the groove (FIG. 4e).

In a median transverse section plane, the hot face 12 has a transverse profile Pc, placed above FIG. 3 for greater clarity.

Preferably, the transverse profile of the hot face is the same irrespective of the transverse section plane selected in a portion of the tile extending, between two transverse planes, over more than 50%, more than 70%, more than 90%, preferably 100% of the length of the tile.

Preferably, the transverse profile Pc is strictly convex over more than 80%, preferably more than 90%, preferably 100% of the width of the tile.

Preferably, the transverse profile Pc does not comprise a strictly concave portion.

Preferably, the transverse profile is outwardly curved. Preferably, this curved transverse profile is substantially symmetrical with respect to the median longitudinal plane, as in the embodiments of FIGS. 1 to 3.

In a transverse section plane, the base B is the line segment that extends between the two ends M1 and M2 of the transverse profile Pc.

Preferably, the ratio $(C_c-I_B)*100/I_B$ is greater than 0.5 and/or less than or equal to 5, preferably less than 2, where the length $C_c$ is the curvilinear length of the transverse profile $P_c$ and $I_B$ is the length of the base.

In the embodiment of FIG. 3, $I_B=I_{10}$.

By convention, in a transverse plane:
x(M) refers to the position of a point M along the base B;
$x_{20}$ refers to the position of the groove 20 along the base B, identified by the position of the point of the groove 20 closest to the base B;
$x_{22}$ refers to the position of the fastening receptacle 22 along the base B, identified by the position of the point of the fastening receptacle closest to the base B, and conventionally in the middle of the fastening receptacle, as shown in FIG. 3;
e(M) refers to the material thickness, at position x(M), above the base B, i.e. from the base to the hot face;
$e_{20}$ refers to the material thickness, above the base B, at position $x_{20}$ of the groove 20;
$e_{22}$ refers to the material thickness, above the base B, at position $x_{22}$ of the fastening receptacle 22;
$e_i$ refers to the material thickness, above the base B, at position $x_i$ at the edge of the groove closest to the fastening receptacle;
e'(M) refers to the material thickness, at position x(M), below the base B, i.e. from the base B to the cold face;
$e'_{20}$ refers to the material thickness, below the base B, at position $x_{20}$ of the groove 20;
e'22 refers to the material thickness, below the base B, at position $x_{22}$ of the fastening receptacle 22;
$e''_{20}$ refers to the material thickness separating the cold face and the hot face at position $x_{20}$ of the groove 20 ($e''_{20}=e_{20}+e'_{20}$);
$e''_{22}$ refers to the material thickness separating the cold face and the hot face at position $x_{22}$ of the fastening receptacle 22 ($e''_{22}=e_{22}+e'_{22}$);
e''(M) refers to the material thickness separating the cold face and the hot face at position x(M);
$e_{min}$ refers to the smallest material thickness separating the cold face and the hot face when M moves along the base, i.e. the smallest value of e''(M);
$e_{max}$ refers to the maximum overall thickness of the tile.

When the distance between the base B, on the one hand, and the fastening receptacle or a groove, on the other hand, is minimal throughout a segment of the base, the position of the fastening receptacle or of the groove, respectively, is considered to be the position of the point that is in the middle of this segment.

According to the invention,
$e_{20}>0$ mm, preferably $e_{20}>0.5$ mm, preferably $e_{20}>1$ mm, preferably $e_{20}>5$ mm, and/or $e_{20}<80$ mm, preferably $e_{20}<50$ mm, $e_{20}<30$ mm or even $e_{20}<20$ mm, or even $e_{20}<10$ mm, or even $e_{20}<5$ mm; and
$e_{22}>0$ mm, preferably $e_{22}>0.5$ mm, preferably $e_{22}>1$ mm, preferably $e_{22}>5$ mm, and/or $e_{22}<80$ mm, preferably $e_{22}<50$ mm, $e_{22}<30$ mm or even $e_{22}<20$ mm.

Preferably, the ratio $e_{22}/e_{20}>1$, preferably $e_{22}/e_{20}>1.1$, preferably $e_{22}/e_{20}>1.3$, preferably $e_{22}/e_{20}>1.5$, preferably $e_{22}/e_{20}>1.8$, preferably $e_{22}/e_{20}>2$, and/or $e_{22}/e_{20}<10$, preferably $e_{22}/e_{20}<5$, preferably $e_{22}/e_{20}<3$.

Preferably, $e(M)\geq 0$, preferably $e(M)>0$, preferably irrespective of the point M of a segment of the considered base, with said segment preferably representing more than 50%, more than 70%, more than 90%, preferably 100% of the length of the base.

Preferably, e(M) increases from point M1 and/or M2 to the middle Mi of the base B. Preferably, the thickness e(Mi) in the middle of the base and/or the thickness $e_{22}$ and/or the thickness $e_{20}$, preferably the thickness $e_{22}$, is the maximum thickness above the base.

Preferably, in the portions of the base extending between the grooves and not extending above the fastening receptacle, e'(M) is constant, preferably greater than 20 mm and/or less than 100 mm.

In one embodiment, the ratio $e_{22}/e_i$ is greater than 1, preferably greater than 1.1 and/or less than 2, preferably less than 1.5 and/or preferably less than 1.3.

Preferably, $e_{22}$ is greater than $e_i$ and $e_i$ is greater than $e_{20}$.

Preferably, the transverse profile Pc has no transversely extending flat portion, preferably no flat portion above the groove and/or above the fastening receptacle, preferably no flat portion.

Preferably, the transverse profile Pc has no singular point, i.e. no break in the slope.

Preferably, the transverse profile Pc is outwardly curved. Preferably, this curved transverse profile is substantially symmetrical with respect to the median longitudinal plane Pm.

More preferably, the ratio $e_{max}/e''_{22}$ is greater than 2 and/or less than 5.

More preferably, the ratio $e_{max}/e''_{20}$ is greater than 1.5 and/or less than 4.

Preferably, $e_{max}$ is measured in the median longitudinal plane of the tile.

Preferably, the ratio $(e_{max}-e_{min})/e_{max}$ is greater than 0.1, 0.2 to 0.3 and/or less than 0.8.

In said transverse plane, the width $I_{27}$ of the opening of the fastening receptacle preferably ranges between 10 and 60 mm.

In said transverse plane, when the considered groove is in the vicinity of a side face 16 of the tile, i.e. is not separated by another groove, the distance from the edge of the groove to said side face is preferably less than 50 mm. In the embodiment shown in FIG. 3, this distance is equal to $I_{26}$.

The features described above for the transverse profile Pc are preferably applicable for all the grooves and the fastening receptacles. They are preferably applicable in any transverse section plane of a fraction of the tile included between two transverse planes separated by a distance, along the direction of the length of the tile, representing more than 50%, preferably more than 70%, more than 90%, preferably 100% of the length of the tile.

When a transverse plane does not intersect the fastening receptacle, the position $x_{22}$ is that of the longitudinal plane (median longitudinal plane $P_m$ in FIG. 3) that passes through the point of the fastening receptacle that is closest to the base plane $P_{12}$.

Preferably, in the median transverse plane, preferably in any transverse plane, the material thickness is maximal above the fastening receptacle and/or above the groove.

In one embodiment, in the median transverse plane, preferably in any transverse plane, the two places where the material thickness above the base is the greatest are above the fastening receptacle and above the groove.

In the median longitudinal plane $P_m$, preferably in any longitudinal plane, the longitudinal profile of the hot face is preferably straight, preferably parallel to the base plane $P_{12}$, as in the embodiments of FIGS. 1 and 2. In one embodiment, the longitudinal profile of the hot face is configured so that the material thickness between the base plane $P_{12}$ and said longitudinal profile is maximal at the position of the anchor (or at the positions of the anchors if the tile comprises a plurality of fastening receptacles), i.e. at the position of the transverse plane that passes through the anchor disposed in the fastening receptacle in the service position.

In one embodiment, the material thickness between the base plane $P_{12}$ and the hot face is maximal at the position of the anchor (or at the positions of the anchors if the tile comprises a plurality of fastening receptacles). In particular, the hot face can assume the general shape of a dome, the apex of which is, in the service position, above the anchor, or a general shape having a plurality of domes, the apexes of which are each, in the service position, above a respective anchor.

In the median longitudinal plane $P_m$, preferably in any longitudinal plane, the profile of the cold face is preferably straight, preferably parallel to the base plane $P_{12}$, ignoring the portions of said longitudinal profile defining the one or more fastening receptacle(s).

Examples

All the tiles of the examples are made with the same material, namely Refrax® Plus (nitride bonded SiC carbide having open porosity of 13% by volume, a SiC content of the order of 77% by mass and thermal conductivity of 16 W/(m*K) at 1,000° C.).

The tiles are tested in a laboratory furnace, the combustion chamber of which is traversed, over the entire height (two meters) thereof, by two parallel vertical tubes 2 (see FIG. 5), with an internal diameter of 50 mm and an external diameter of 62 mm. The two tubes 2 are connected together by a 310 grade metal plate 24, that is 12 mm thick and 18 mm wide. This metal plate comprises ten 310 grade metal anchors that are disposed vertically so as to retain ten identical tiles 10 resting on each other.

Each metal anchor is formed by a 40 mm long threaded rod welded to the metal plate 24 and an 8 mm diameter bolt screwed into the end of the rod. The bolt is thus movable at the end of the rod in order to allow precise adjustment of a spacing of 8 mm between each groove and the opposite tube.

During anchoring, the tiles are grouted with a 3 mm thick mat of silico-aluminous fibers and with thermal conductivity of 0.2 W/(m*K) at 1,000° C., in order to accommodate any expansion.

A Refrax® PLUSFlow self-leveling concrete 30 comprising 70.5% by mass of SiC and having an apparent density after drying of 2.7 g/cm³ and thermal conductivity of 6 W/(m*K) at 1,000° C. is then cast between the tiles and the membrane formed by the tubes 2 and the metal plate 24. The concrete is dried before the temperature of the furnace rises.

Figure 4:
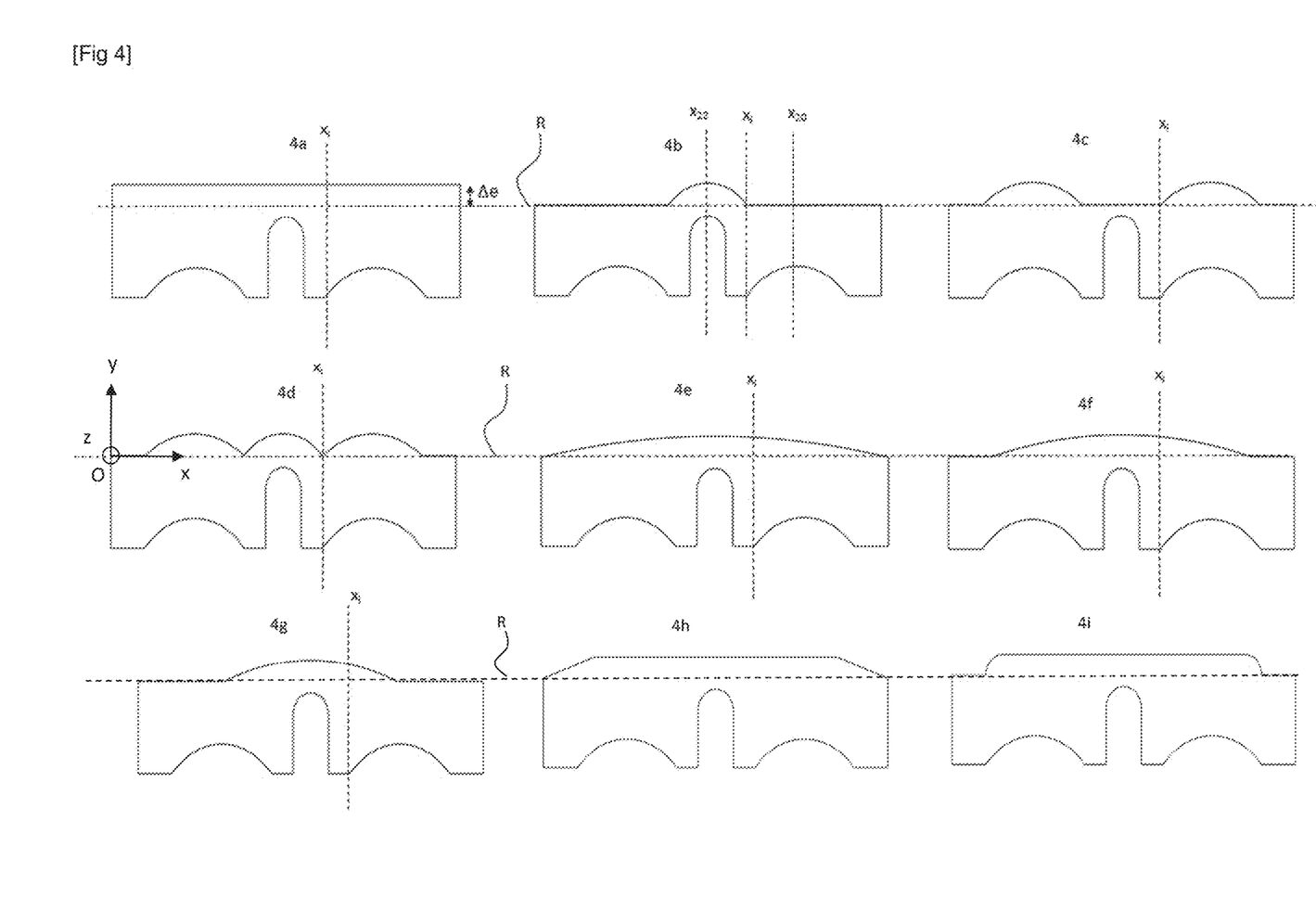
FIG. 4 shows transverse profiles of tiles of comparative examples (4a to 4d) and of examples according to the invention (4e to 4g)

The cold faces and the side faces of all the tested tiles are identical, with the exception of the side faces in FIG. 4a, which are more extensive on the side of the hot face. The tile in FIG. 4a is thus uniformly thickened, compared to the other tiles, with a thickness Δe of 9.5 mm beyond the reference plane R plotted in FIG. 4. The base plane $P_{12}$ therefore coincides with the reference plane R, except for FIG. 4a.

Each cold face defines a single fastening receptacle and two grooves disposed so that stacking the ten tiles forms a refractory lining covering the tubes over the entire height of the combustion chamber. This lining is supplemented with a conventional insulator 32, in this case RI34 insulating refractory bricks, so as to cover the entire wall of the combustion chamber over which the membrane extends.

Each tile has a length $L_{10}$ of 200 mm, a width $I_{10}$ of 194 mm, thicknesses $e_{max}$ and $e''_{22}$, with reference to FIG. 3, of 50 mm and 14.5 mm, respectively. The maximum thickness $e_{max}$ is at the positions $x_{22}$ of the fastening receptacles 22, so that the anchor depth is 35.5 mm. The fastening receptacles, all identical, have an opening $O_{22}$, on the cold face, of 20 mm.

Each of the two grooves has a depth $P_{20}$, an opening $O_{20}$ and a radius of curvature of 13 mm, 55.9 mm and 36.5 mm, respectively.

An intermediate position $x_i$ is also defined, between position $x_{22}$ of the fastening receptacle 22 and position $x_{20}$ of a groove 20. The thickness $e_i$ is the thickness at the intermediate position $x_i$, starting from the base.

Position $x_i$ is 22.1 mm from position $x_{22}$. The intermediate position is the position of the edge of a groove closest to the fastening receptacle. In FIGS. 4b and 4d, the intermediate position is also the position of the longitudinal edge of a camber centered on the position of the fastening receptacle and which extends over the entire length of the tile. In FIGS. 4c and 4d, the intermediate position is also the position of a longitudinal edge of a camber centered on the position of a groove and which extends over the entire length of the tile, with the other longitudinal edge of the camber extending 77.9 mm from position $x_{22}$ of the fastening receptacle 22 (55.8 mm camber width).

In FIG. 4f, the longitudinal edges of the camber centered on the position of the fastening receptacle extend 77.9 mm from position $x_{22}$ of the fastening receptacle 22 (155.8 mm camber width).

In FIG. 4g, the longitudinal edges of the camber centered on the position of the fastening receptacle extend 48.4 mm from position $x_{22}$ of the fastening receptacle (97 mm camber width).

Figure 6:
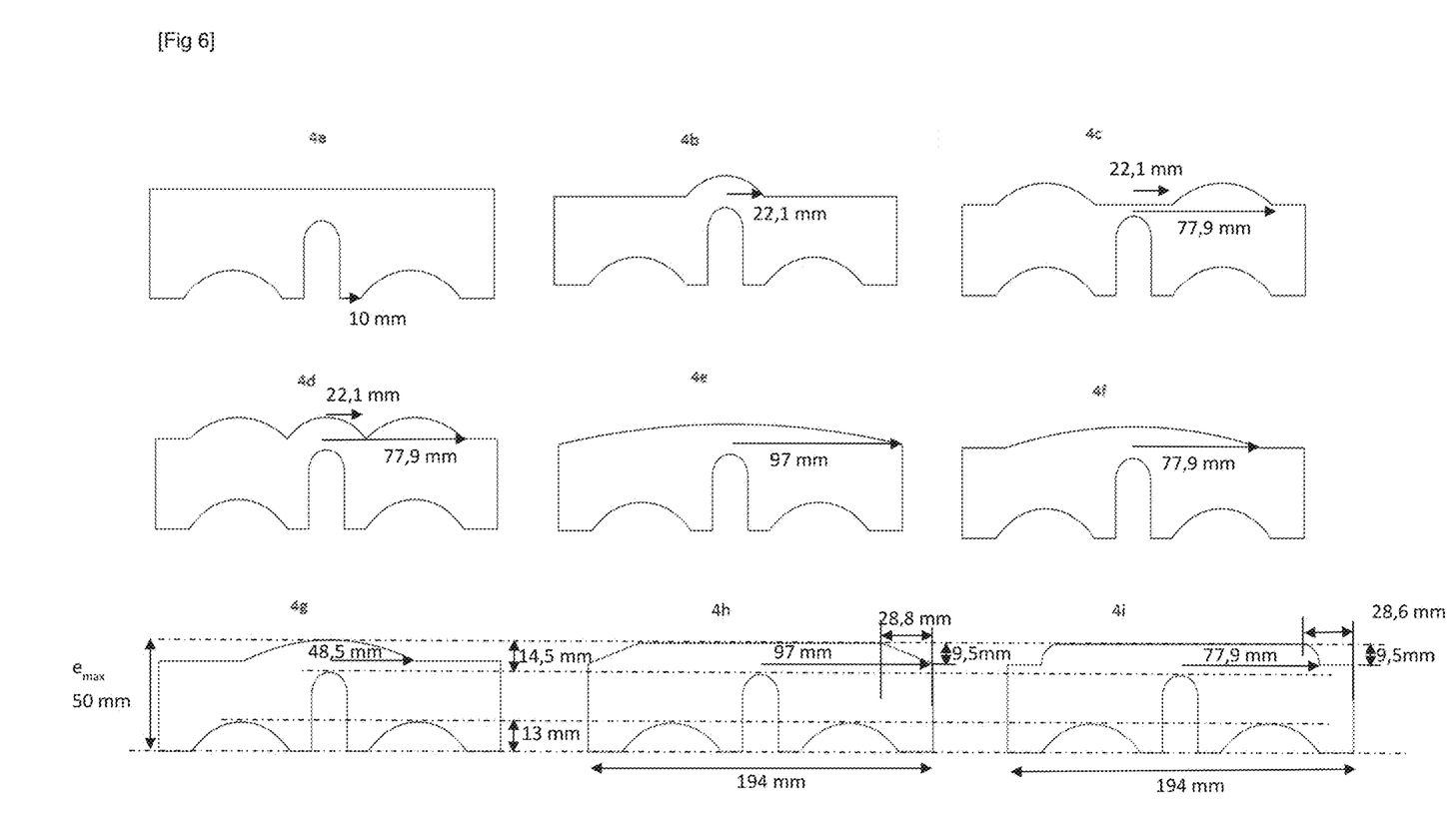
FIG. 6 shows the transverse profiles of FIG. 4 with dimensional information.

In FIG. 4h, representing the profile of FIG. 4 of FR 2785670 A1, the transverse profile is formed by a flat portion bordered by a bevel at each end. The projected length of the bevels on the base is 28.8 mm (FIG. 6). The ends of the transverse profile are 97 mm from position $x_{22}$ of the fastening receptacle 22.

Finally, a type K thermocouple measures the temperature T3 at the end of the anchor.

The results are shown in Table 1 below.

The dimensions that are indicated are expressed in mm.

The thickness measurement positions refer to the preceding description, and in particular to the description of FIG. 3.

The power P is computed by considering the increase in temperature of the water between the inlet and the outlet of the tubes according to the following formula: P=[Ts−Ti]*flow*Cp (water) where the flow is 0.5 L/s.

Table 1 provides, by way of an example, the relative difference of the maximum temperature measured by the type S thermocouples for this example (Tmax=max(T1, T2)) compared to that of example 1 ($Tmax_1$), i.e. (Tmax−$Tmax_1$)/$Tmax_1$.

Tmax represents the maximum temperature on the hot face. Measuring said difference thus makes it possible to assess the effect of the shape of the tile on this maximum temperature.

Table 1 provides, by way of an example, the relative difference of the maximum temperature measured at the anchor T3 ($T3_{Example}$) compared to that of example 1 ($T3_{Example\ 1}$), i.e. ($T3_{Example}$−$T3_{Example\ 1}$)/$T3_{Example\ 1}$.

TABLE 1

|  | 1 (*) | 2 (*) | 3 (*) | 4 (*) | 5 | 6 | 7 | 8 (*) | 9 (*) |
|---|---|---|---|---|---|---|---|---|---|
| FIG. | 4a | 4b | 4c | 4d | 4e | 4f | 4g | 4h | 4i |
| Curvilinear length $C_c$ of the transverse profile $P_c$ | 194 | 199.2 | 202.4 | 207.6 | 195.2 | 195.6 | 196.4 | 197 | 204.8 |
| Thickness $e_{20}$ (to the right of the groove) | 0 | 0 | 9.5 | 9.5 | 7 | 4.5 | 0 | 9.5 | 9.5 |
| Thickness $e_i$ (intermediate position) | 0 | 0 | 0 | 0 | 9.0 | 8.6 | 7.6 | 9.5 | 9.5 |
| Thickness $e_{22}$ (to the right of the fastening receptacle) | 0 | 9.5 | 0 | 9.5 | 9.5 | 9.5 | 9.5 | 9.5 | 9.5 |
| Increase in transferred thermal power P | 100 = ref | 4% | 3% | 2% | 2% | 3% | 3% | 0% | ≤1% |
| Increase in Tmax (hot face) | 100 = ref | +4% | −1% | +2% | +1% | +1% | +2% | −1% | 0% |
| Increase in T3 (anchor) | 100 = ref | +5% | +4% | +2% | +1% | +1% | +1% | 0% | 0% |

In FIG. 4i, representing the profile of FIG. 3 of WO 2007/137189 A2, the transverse profile is formed by a flat portion bordered by a round corner forming a 90° arc, the projected length of which on the base is 28.6 mm. The ends of the transverse profile are 77.9 mm from position $x_{22}$ of the fastening receptacle 22.

All the tiles of the same example are identical. The examples differ with respect to the transverse profile of the hot face of the tile that is used. The tested transverse profiles are those of FIGS. 4a) to 4i). They are identical irrespective of the considered transverse plane.

For each example, the combustion chamber at ambient pressure, in air, is heated by means of graphite resistors up to a setpoint temperature of 1,200° C.

Water is circulated through the tubes. The inlet temperature Ti of the water is approximately 20° C. The flow rate is 0.5 L/s per tube. The temperatures of the water at the inlet Ti and at the outlet Ts of the tubes are measured by means of probes inserted into said tubes and fastened so as to provide a seal.

Figure 5:
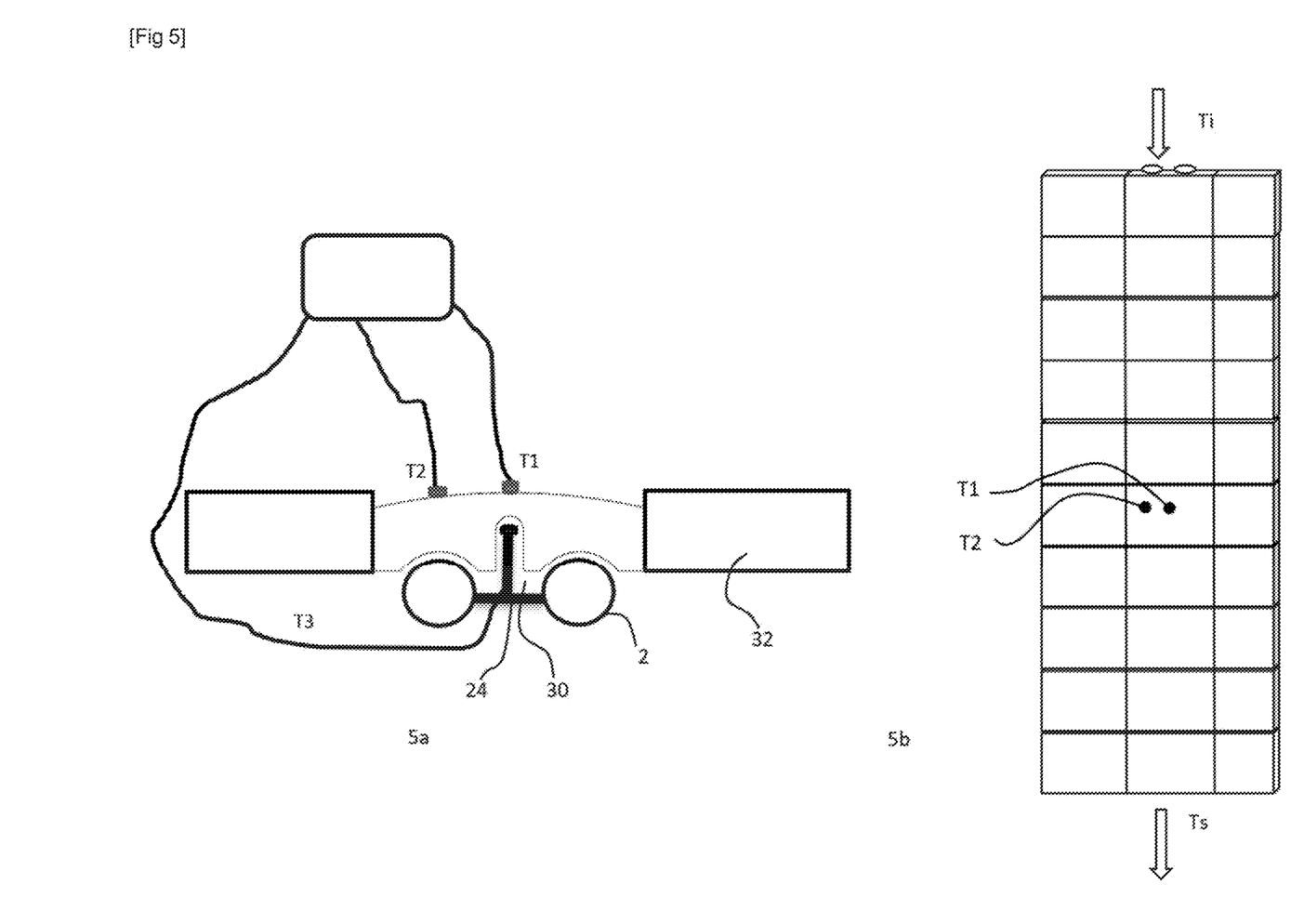
FIG. 5 schematically shows the characterization device used for the examples.

Furthermore, as is schematically shown in FIG. 5, two type S thermocouples are placed on the hot face of the 5$^{th}$ tile from the bottom:
 the first thermocouple is disposed opposite the anchor and measures the temperature T1,
 the second thermocouple is disposed halfway up the tile opposite one of the tubes. It measures the temperature T2.

The inventors consider that, in the targeted applications:
 the temperature T3 should not increase by more than 1.5%;
 the temperature Tmax should not increase by more than 1.5%;
 the transferred power should be maximal.

In these examples, it can be seen that a camber in the hot face that does not cover at least the region of this face included between the position of the fastening receptacle of the anchor and the position of the grooves does not allow the desired compromise to be achieved.

In a remarkable manner, it also can be seen that the tiles according to the invention have superior performance capabilities to the tile of FIG. 4a, which tile has an overthickness Δe, even though they are less bulky.

Examples 6 and 7 are considered to be the most preferred.

As is clearly apparent, the tiles of the invention with a material thickness, above the base, from the position of the anchor to the positions of the grooves, or even beyond the positions of the grooves, have the best compromise between maximum thermal power transfer and the lowest possible temperature at the end of the anchor and on the hot face of the tile, resulting in good cracking resistance.

The invention therefore provides a space-saving tile that provides thermal protection for the tubes, while ensuring heat transfer that is suitable for energy recovery. The progressive curved shape is considered to be optimal.

Of course, the invention is not limited to the embodiments described and shown, which are provided for illustrative purposes only.

The invention claimed is:

1. A refractory tile, which is intended, in a service position, to protect a wall of energy recovery tubes internally lining a combustion chamber of a furnace, said tile having:
    a face, called "hot face", which is intended, in said service position, to be exposed inside the furnace;
    a face, called "cold face", opposite the hot face, defining:
    a groove extending over the entire length of the tile and intended, in said service position, to receive one of said tubes; and
    a fastening receptacle configured to receive, in said service position, an anchor, or "retaining member", so as to immobilize the tile with respect to said tube,
the tile being characterized in that it has, in a transverse section plane, at least at each position between the position of the groove and the position of the fastening receptacle, a non-zero material thickness, and in that the ratio of the material thickness at said position of the fastening receptacle to the material thickness at said position of the groove is greater than 1,
    the thickness being measured between the transverse profile of the hot face and a straight segment, called "base", connecting the ends of the transverse profile of the hot face, said positions being determined along said base, a transverse plane being a plane perpendicular to the direction of the length of the tile and a transverse profile being a profile in a transverse plane;
the direction of the length of the tile being defined by the general direction of the groove;
the direction of the width of the tile being defined by the direction perpendicular to the direction of the length, in the general plane of the tile; and
the thickness being measured perpendicular to the directions of the length and of the width;
the position of the groove along the base being identified by the position of the point of the groove closest to the base; and
the position of the fastening receptacle along the base being identified by the position of the point of the fastening receptacle closest to the base.

2. The tile as claimed in claim 1, wherein the ratio of the material thickness at said position of the fastening receptacle to the material thickness at said position of the groove is greater than 1.2.

3. The tile as claimed in claim 2, wherein the ratio of the material thickness at said position of the fastening receptacle to the material thickness at said position of the groove is greater than 2.

4. The tile as claimed in claim 1, wherein, at said position of the groove, said material thickness is less than 30 mm.

5. The tile as claimed in claim 1, wherein, at said position of the fastening housing and/or at said position of the groove, said material thickness is greater than 5 mm.

6. The tile as claimed in claim 1, wherein said material thickness is maximal at the position of the fastening housing.

7. The tile as claimed in the claim 6, wherein said material thickness is maximal only at the position of the fastening housing.

8. The tile as claimed in claim 1, having one of said non-zero material thicknesses at any position on a segment of said base representing more than 70% of the length of said base.

9. The tile as claimed in claim 1, wherein said material thickness increases as the position, along the base, approaches the position of the fastening receptacle.

10. The tile as claimed in claim 1, wherein said transverse profile develops, along said base, without a break in the slope.

11. The tile as claimed in claim 1, wherein said transverse profile is strictly convex over more than 80% of the width of the tile.

12. The tile as claimed in claim 1, comprising a single fastening receptacle and exactly two grooves extending on either side of the fastening receptacle, said transverse profile is symmetrical with respect to the median longitudinal plane of the tile.

13. The tile as claimed in claim 1, the cold face having a longitudinal bevel along each of the longitudinal edges thereof and/or a transverse bevel along each of the transverse edges thereof.

14. The tile as claimed in claim 1, said transverse profile being in any transverse section plane of a fraction of the tile included between two transverse planes separated by a distance, along the direction of the length of the tile, representing more than 50% of the length of the tile, with the length of the tile being defined by the general direction of the groove.

15. The tile as claimed in claim 1, wherein the hot face has, in the median longitudinal plane, a longitudinal profile configured so that the material thickness between the base plane of the hot face and said longitudinal profile is maximal at the position of the transverse plane that passes through the position of the fastening receptacle, the median longitudinal plane being the longitudinal plane at the mid-width of the tile, with a longitudinal plane being a plane perpendicular to the direction of the width of the tile, the base plane of the hot face being the plane in which the contour externally defining the hot face extends.

16. The tile as claimed in claim 15, wherein the material thickness between the base plane of the hot face and the hot face is maximal at the position of the fastening receptacle.

17. The tile as claimed in claim 15, wherein the hot face has, in any longitudinal plane, a longitudinal profile configured so that the material thickness between the base plane of the hot face and said longitudinal profile is maximal at the position of the transverse plane that passes through the position of the fastening receptacle, the median longitudinal plane being the longitudinal plane at the mid-width of the tile, with a longitudinal plane being a plane perpendicular to the direction of the width of the tile, the base plane of the hot face being the plane in which the contour externally defining the hot face extends.

18. A furnace comprising a combustion chamber internally lined with:
    a plurality of energy recovery tubes; and
    an assembly of refractory tiles suspended from anchors rigidly connected to said tubes and arranged so as to protect said tubes,
said assembly comprising a tile as claimed in claim 1.

19. A furnace according to claim 18, which is a furnace for incinerating household waste or biomass.

* * * * *